United States Patent [19]

Barnes et al.

[11] Patent Number: 5,010,960
[45] Date of Patent: Apr. 30, 1991

[54] METHOD OF TILLING WITH IMPROVED DRAFT CONNECTION

[75] Inventors: Billey R. Barnes, Lemesa; Ronny L. Barnes; David A. Gary, both of O'Donnell, all of Tex.

[73] Assignee: Bar-Gar Corporation, O'Donnell, Tex.

[21] Appl. No.: 479,083

[22] Filed: Feb. 12, 1990

Related U.S. Application Data

[60] Division of Ser. No. 331,454, Mar. 31, 1989, Pat. No. 4,905,769, which is a continuation-in-part of Ser. No. 925,162, Oct. 31, 1986, Pat. No. 4,860,833, which is a continuation-in-part of Ser. No. 754,619, Jul. 12, 1985, Pat. No. 4,655,295.

[51] Int. Cl.⁵ .................... A01B 59/041; A01B 59/06
[52] U.S. Cl. ........................................ 172/1; 172/272; 172/450; 172/677
[58] Field of Search .................. 172/1, 23, 26, 272, 172/312, 439, 443, 450, 677; 280/455.1, 460.1, 461.1, 474; 180/247

[56] References Cited

U.S. PATENT DOCUMENTS

| | | | |
|---|---|---|---|
| 2,653,824 | 9/1953 | Frevik | 172/450 |
| 2,653,825 | 9/1953 | Collins | 172/450 |
| 3,029,880 | 4/1962 | Heberlein | 172/272 |
| 3,184,252 | 5/1965 | Cook | 172/450 X |
| 3,749,421 | 7/1973 | Rudd | 172/439 |
| 3,807,769 | 4/1974 | Thompson et al. | 172/272 |
| 4,506,773 | 3/1985 | Schott | 180/247 |
| 4,664,404 | 5/1987 | Schultz | 280/461.1 |

FOREIGN PATENT DOCUMENTS 222930 9/1961 Austria .................... 172/450

OTHER PUBLICATIONS

Progressive Farmer, "Stabilizer Improves Tractor Efficiency" Jun. 1987, p. 56.

*Primary Examiner*—Dennis L. Taylor
*Assistant Examiner*—Jeffrey L. Thompson
*Attorney, Agent, or Firm*—Wendell Coffee

[57] ABSTRACT

A tractor includes front wheels and rear wheels. A three-point hitch connects a yoke to the tractor. The yoke is stabilized by stabilizer arms which are connected under the rear tractor axles and to the frame of the tractor forward of the rear tractor axles. The stabilizer arms lock up the yoke so that it is rigidly fixed to the tractor when an earth working implement tilling the soil is stressing the yoke. The stabilizer arms are connected to the yoke by chain links which permit the yoke to be raised and lowered by the three-point hitch, but which prevent any lateral movement or flexibility to the yoke. This rigidity in part is by having the chain link connection of each stabilizing link straddle the connection of the three-point hitch to the yoke. In addition, the two stabilizing arms are connected by a cross brace which is bolted in place. The cross brace may be unbolted in the event a power takeoff shaft is to be used, which would otherwise be blocked by the cross brace.

4 Claims, 4 Drawing Sheets

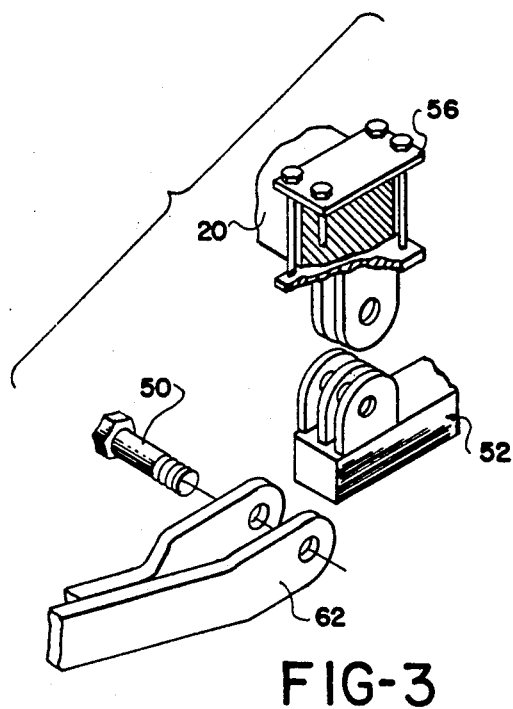
FIG-3
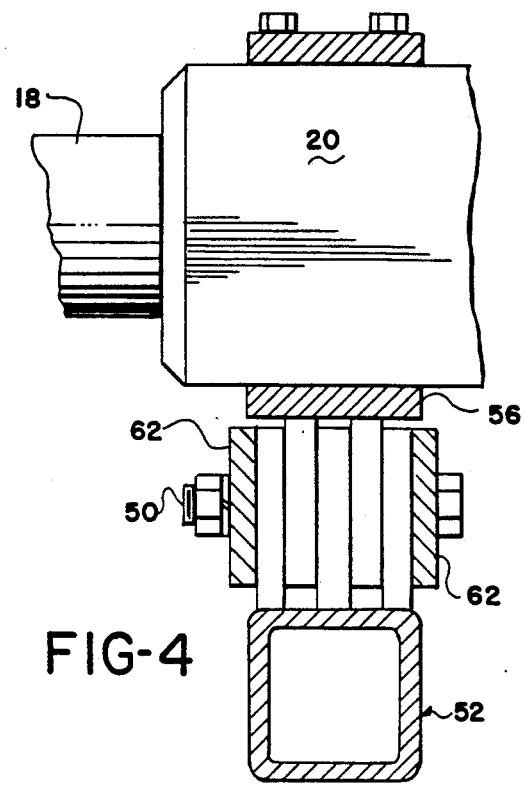
FIG-4
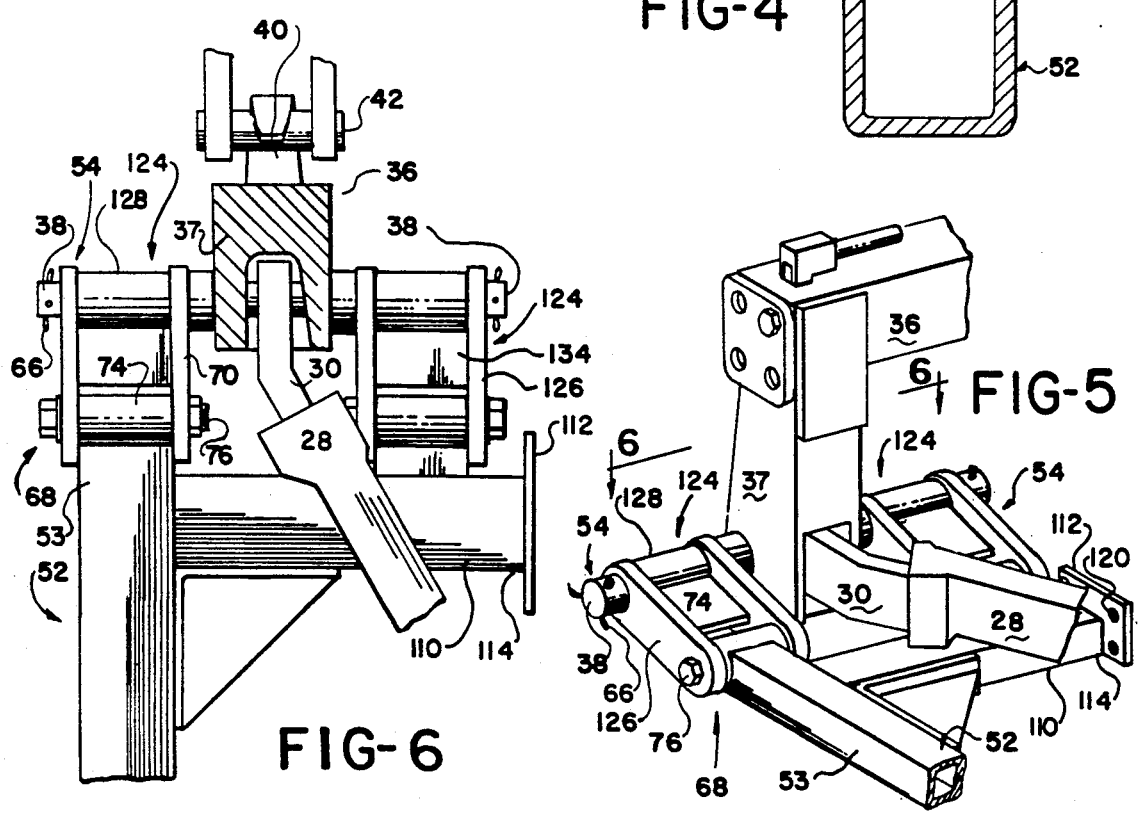
FIG-6
FIG-5

METHOD OF TILLING WITH IMPROVED DRAFT CONNECTION

CROSS REFERENCE TO RELATED APPLICATIONS

This is a division of the prior patent application entitled, "DRAFT CONNECTION", Ser. No. 07/331,454, Mar. 31, 1989, issued as U.S. Pat. No. 4,905,769, Mar. 6, 1990; which was itself a continuation-in-part of the prior application entitled, "DRAFT CONNECTION", Ser. No. 06/925,162, Oct. 31, 1986, issued as U.S. Pat. No. 4,860,833, Aug. 29, 1989; which was itself, a continuation-in-part of prior application entitled, "TRACTOR STABILIZER", Ser. No. 06/754,619, July 12, 1985, issued as U.S. Pat. No. 4,655,295 Apr. 7, 1987. All of the inventors of those applications are co-inventors of this application, the present ownership of the issued patents are all the same as the ownership of this application.

BACKGROUND OF THE INVENTION (1) Field of the Invention

This invention relates to earth working, and more particularly to agriculture tillage. Farmers have ordinary skill in the art to which this invention relates.

(2) Description of the Related Art

For many years, farm tractors have been used to draft tillage equipment, and particularly heavy tillage equipment, through fields By heavy tillage equipment, it is meant tillage equipment that tills the soil deeply, e.g., over 3". Besides turning plows and rippers, listers are common type of such equipment.

Because agricultural development in the United States and the increased labor costs, extremely large tractors are used so that only one farmer can till large areas of land. As used herein, a large tractor means a tractor having over 45 horse power. At a time when labor costs were less, it was economically feasible to use small tractors. Now, the use of smaller tractors is prohibitively expensive because each tractor requires a human operator. Therefore, for many years, the trend in United States agriculture has been to use larger and larger tractors. The tool bars are long and equipped with gauge wheels. A wide strip or swath of ground is tilled with each pass of the tractor.

Typically, these large tractors have low pressure pneumatic tires. As the power of the tractor increases, it is necessary to increase the weight for sufficient traction upon the soil to draft the heavy tillage equipment through the earth. To prevent undue compaction of the ground under the wheels, extremely large tires with low air pressure are used to distribute the weight of the tractor over a large area.

However, large tires with low air pressure results in a lack of lateral stability. The frame of the tractor tends to move back and forth laterally even though the tread of the tires follows the earth faithfully. The tires themselves permit the wheels, and thus the frames, to move laterally.

Farmers have always had difficultly plowing straight furrows. Surface indentation, rocks, clods, clumps of weeds, grasses and roots, steering corrections, and other causes of lateral shifts, jumps, jerks, and wiggles the implement seems uncorrectable with prior art equipment. In fact, a lateral sway was designed into the hitch (Morling, pages 7 and 11). (Roy W. Morling, *Agricultural Tractor Hitches Analysis of Design Requirements*, No. 5, Dec. 12, 1979, published by ASAE, P.O. Box 410, St. Joseph, Mich. 49085) A copy of this publication is available in the Patent Office file of our prior patent application, Ser. No. 07/925,162. The soft tires tend to aggravate the problem. Also, with long tool bars, plows on one end may be plowing in hard soil while plows on the other end are plowing in soft soil.

It has long been known in the design of draft vehicles, such as farm tractors, that the equipment might be drafted from the frame of the tractor forward of the rear axles. Examples of such drafting apparatus include the French patent to GUILLOTTE, Pat. No. 1,098,133, "publie" July 18, 1955 or the U.S. Pat. No. 2,713,295 to SILVER ET AL. Also, see page 4 of Morling. Although the drafting from this position seems advantageous, applicants have difficulty explaining why this advantageous result came about. The only publication they found that seemed to discuss the problem was Morling and the publication by Gill and Berg, "Soil Dynamics in Tillage and Traction" by William R. Gill and Glen B. Vanden Berg, a publication of the Agricultural Research Service of the United States Department of Agriculture, United States Printing Office, 1967. Pages 340-342, 364-365, 416-421, and 511 of this publication are available in the Patent Office file of our prior patent application, Ser. No. 07/925,162. Applicants have provided the highlighting.

Gill and Berg indicate at page 340 the efficiency of power transmission from the rear axle through the tires into tilled or agricultural soil is perhaps no better than 50 percent (as applicants understand the discussion).

About 1950, the great advantages of the three point hitches were commercially recognized. Three point hitches are shown in the U.S. Pat. No. 4,142,588 issued to DOSS, Mar. 6, 1979; ALTGELT, U.S. Pat. No. 2,637,262, May 5, 1953; and ANDERSON, U.S. Pat. No. 2,797,627, July 2, 1957, for example. These three point hitches have the great advantage of providing quick attachment and detachment of implements to farm tractors. The three point hitch made it possible for one man to quickly detach one implement and attach another. Also, see page 6 of Morling. Because of the great advantages of the three point hitch, tractor manufacturers quit manufacturing tractors with equipment drafted from the frame forward of the rear axle. Many three point hitches include forces sensing and load control features. Morling concludes that these features are not economically beneficial for large tractors (pages 17, 18, and 27). Energy losses are explained on page 18.

In recent years, quick couplers or quick hitch frames have become widely used. (Morling, page 21) The quick hitch frame is a yoke or frame which is attached to the ends of the three links of the three point hitch. The rear of the yoke or frame contains hooks which may readily be hooked onto horizontal bolts and pins by which the agricultural implements would otherwise be hooked to the distal points of the three links.

Farm tractors or tractors for agricultural use are normally not single use vehicles. Although it has been described as primarily being used to draft heavy tillage equipment, it will also be understood that at various times they are used to draft equipment requiring a power takeoff shaft from the engine of the tractor to the towed implement. In addition to this, often times, the towed implement will be connected by a trailer hitch or the trailer itself might be connected.

The design of the tractors is such that the power takeoff and trailer hitch sometimes would interfere with the cross bracing of the hitch as shown in the application of Ser. No. 06/925,162 indicated above.

The rear three point hitch tends to lift the front of the tractor off the ground during certain conditions. It was often sought to correct this problem by use of counterweights at the front of the tractor.

RUDD, U.S. Pat. No. 3,749,421, issued June 31, 1973, discloses arms which extend from bearings on the rotating axle outboard of the rear large tractor tires. These are connected to a tool bar or an elongated draw bar. The tractor lift arms are connected to the draw bar by pivot blocks 54.

The following patents are of record in the parent application (some are discussed above).

| U.S. Pats. | |
| --- | --- |
| MCCALL | 984,581 |
| PLUM | 1,608,666 |
| HESTER | 2,019,854 |
| THEIS | 2,197,670 |
| WATSON | 2,496,760 |
| ALTGELT | 2,637,262 |
| SILVER ET AL | 2,713,295 |
| RUDIO | 2,752,838 |
| ANDERSON | 2,797,627 |
| NEEDHAM | 3,021,621 |
| STEFFE | 3,601,202 |
| RUDD | 3,749,421 |
| CAPEHART | 3,840,076 |
| QUANBECK | 4,068,723 |
| BUCK ET AL | 4,069,874 |
| LARSON | 4,117,889 |
| DOSS | 4,142,588 |
| WILLIAMS | 4,331,345 |
| French Patent | |
| GUILLOTTE | 1,098,133 |

These patents are considered pertinent because the applicant believes the Examiner would consider anything relevant or pertinent to the parent application to be relevant to the examination of this application.

SUMMARY OF THE INVENTION (1) Progressive Contribution to the Art

We have discovered that, if the prior method of drafting forward of the rear wheels from under the frame of the tractor is combined with the three point hitch, according to our invention, many advantages result.

First, applicants find that the lateral shifting of the tractor and tillage implement is eliminated or at least greatly reduced. Therefore, straight rows are plowed.

Second, applicants find that the drafting capabilities of the tractor are greatly improved with less tire slippage. The tractor engine does not surge.

Third, there is better weight distribution between the front and rear wheels. The plow depth is constant.

Fourth, the convenience of the quick implement change and the control obtained by the three point hitch is retained.

Fifth, if the individual bars are laterally rigidly connected to the yoke or quick hitch frames, some of the bracing can be removed to provide a passageway for power takeoff shafts or trailer hitches.

As discussed in our prior application Ser. No. 06/925,162; the advantages of better drafting and increased fuel consumption are not fully understood. Reference is made to that discussion and to the further discussion in Gill and Berg on page 416 concerning this.

Basically, the design of this invention is characterized by the three point hitch combined with the connection forward of the rear wheels by having the draft arm connected as a stabilizing frame which extends rearwardly from below the rear axles to connect to a quick hitch frame (hereafter called a yoke). The yoke is connected by a conventional three link connection. The stabilizing arms have a short chain link between the rear end of the stabilizing arms and the yoke so that the axis of the stabilizing arm is actually below the bolt to which the chain link is attached to the yoke. In one embodiment of this application, the stabilizing arm is bifurcated at the rear so that on each side, two chain links are used. By having two chain links in the biforcated fashion, greater rigidity results.

The connection, as described, results in extremely rigid connection between the plows and the tractor. Wherein the prior art taught that there should be some sway and lateral movement as well as vertical movement, it is the teaching of this application that while plowing, the plows should be fixed to the tractor in one rigid position and that all possible motion, flexibility, or movement between the tractor and the plow eliminated.

With the rigidity obtained by the bifurcated stabilizing arm, it is not essential for improved performance to have a cross brace from one stabilizing arm to the other. Through empirical tests, we have found that the improved performances over the prior art is obtained without the cross brace. However, we have also found with the cross brace in place, there is even better performance; and therefore, unless the convenience of being able to quickly shift from a power takeoff or trailer hitch operation to a heavy tillage operation is desired, it is preferable that the brace be retained. However, in the event the individual operator desires to have the convenience to be able to maintain the equipment with the power takeoff or trailer hitch in place, the center brace should be bolted in place so that it may be readily removable for this changed operation.

(2) Objects of this Invention

An object of this invention is to till agricultural fields.

Another object of this invention is to provide a hitch which can quickly be detached from heavy tillage equipment to be used with equipment requiring a power takeoff from the tractor.

Further objects are to achieve the above with devices that are sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is rapid, versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 3 is an exploded perspective view of the axle clamp and pivot beneath the axle.

FIG. 4 is a front sectional view of the axle clamp.

FIG. 5 is a perspective view of the connection of the draft links to the yoke, with the cross brace removed.

FIG. 6 is a top sectional view of the draft connection pin area of the yoke taken substantially on line 6—6 of FIG. 5, with the cross brace removed.

Figure 1:
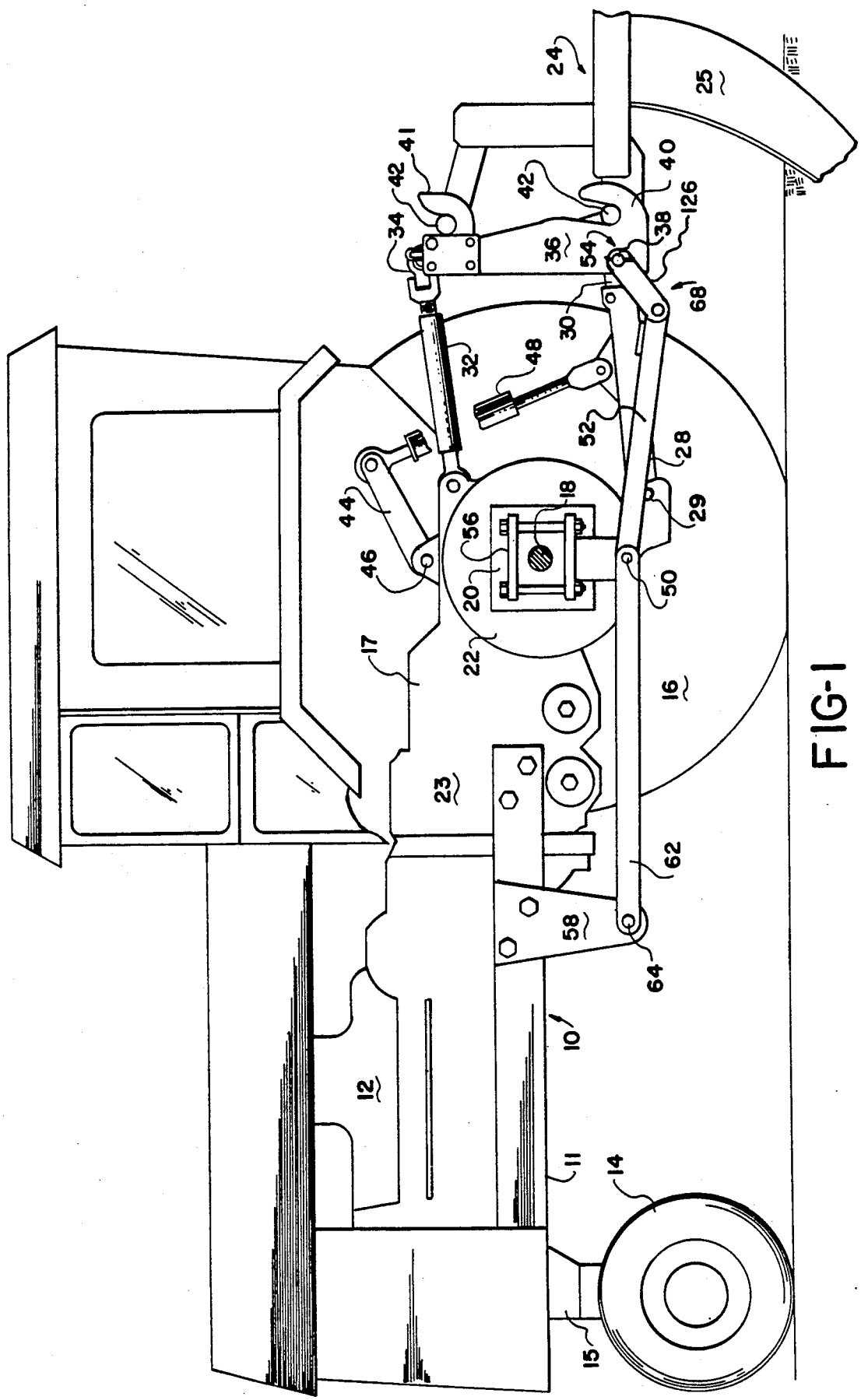
FIG. 1 is a side elevational view of a farm tractor with an embodiment of this invention. Parts have been broken away and one wheel removed for clarity.

As an aid to correlating the terms of the claims to the exemplary drawing, the following catalog of elements and steps is provided:

10 frame
11 beams
12 engine
14 front wheels
15 front axle
16 rear wheels
17 transmission means
18 rear axle
20 axle housing
21 power takeoff shaft
22 differential housing
23 transmission housing
24 tillage or earth working implement
25 plow
26 tires
28 lift draw arm or draft link
29 pins
30 distal end
32 top arm or link
34 top distal end
36 yoke
37 yoke legs
38 pin or shaft
40 draft hooks
41 top hook
42 implement pins
44 lift arms
46 lift shaft
48 lift connecting rod
50 draw pins
52 stabilizer draw arm or auxiliary draw link
53 rear end of arms
54 connection
56 axle clamp
58 belly plates
62 frame draw arm or pitman
64 belly pin
66 key
68 pivot
74 bushing
76 pivot bolt
110 cross arm
112 flat plate (fitting)
114 medial end
116 cross brace
118 flat plate
120 bolt holes
122 bolts
124 chain link units
126 chain link
128 bushing
134 web

DESCRIPTION OF THE PREFERRED EMBODIMENT

Figure 2:
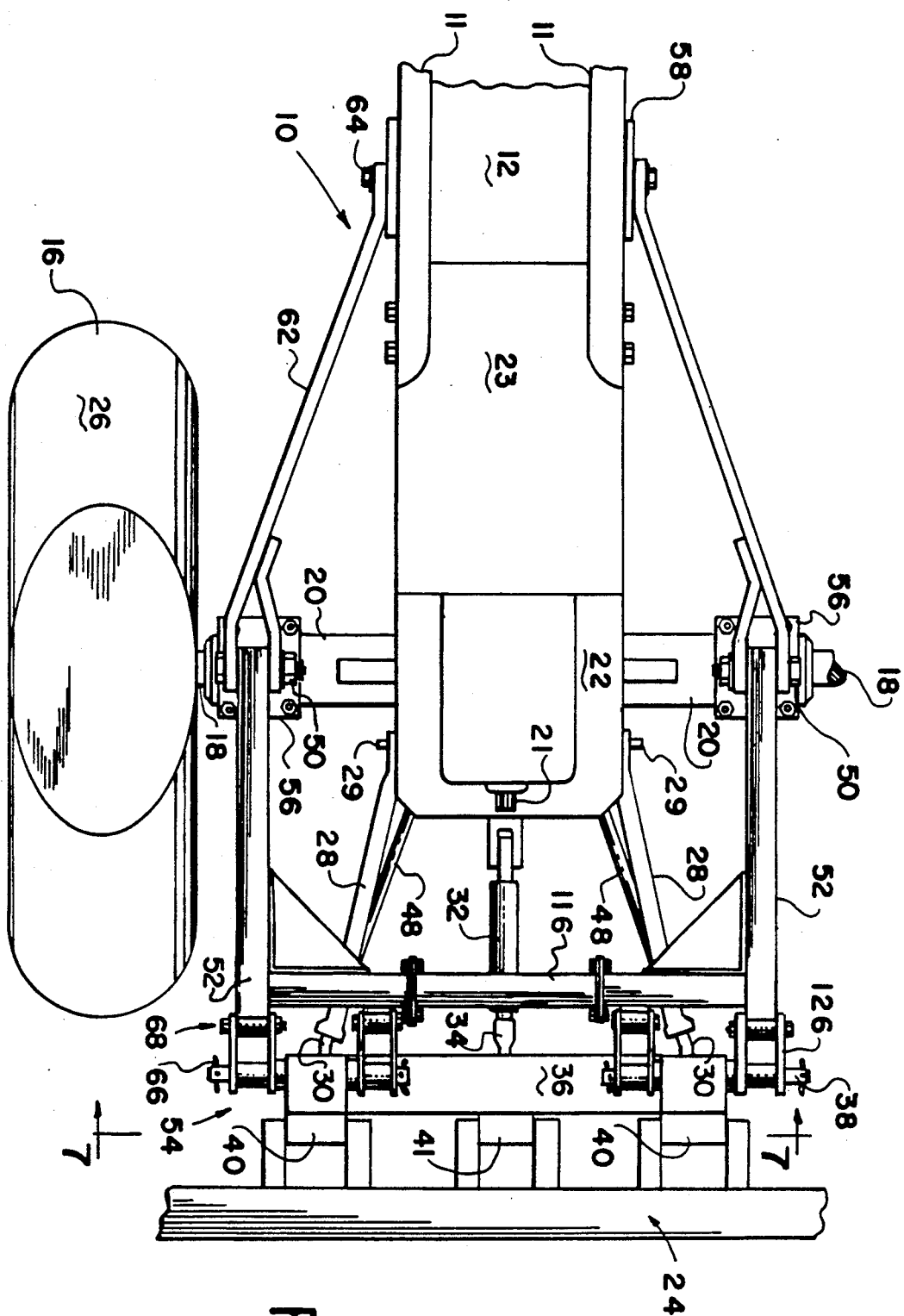
FIG. 2 is a bottom plan view of the rear of the tractor showing the invention.
Figure 7:
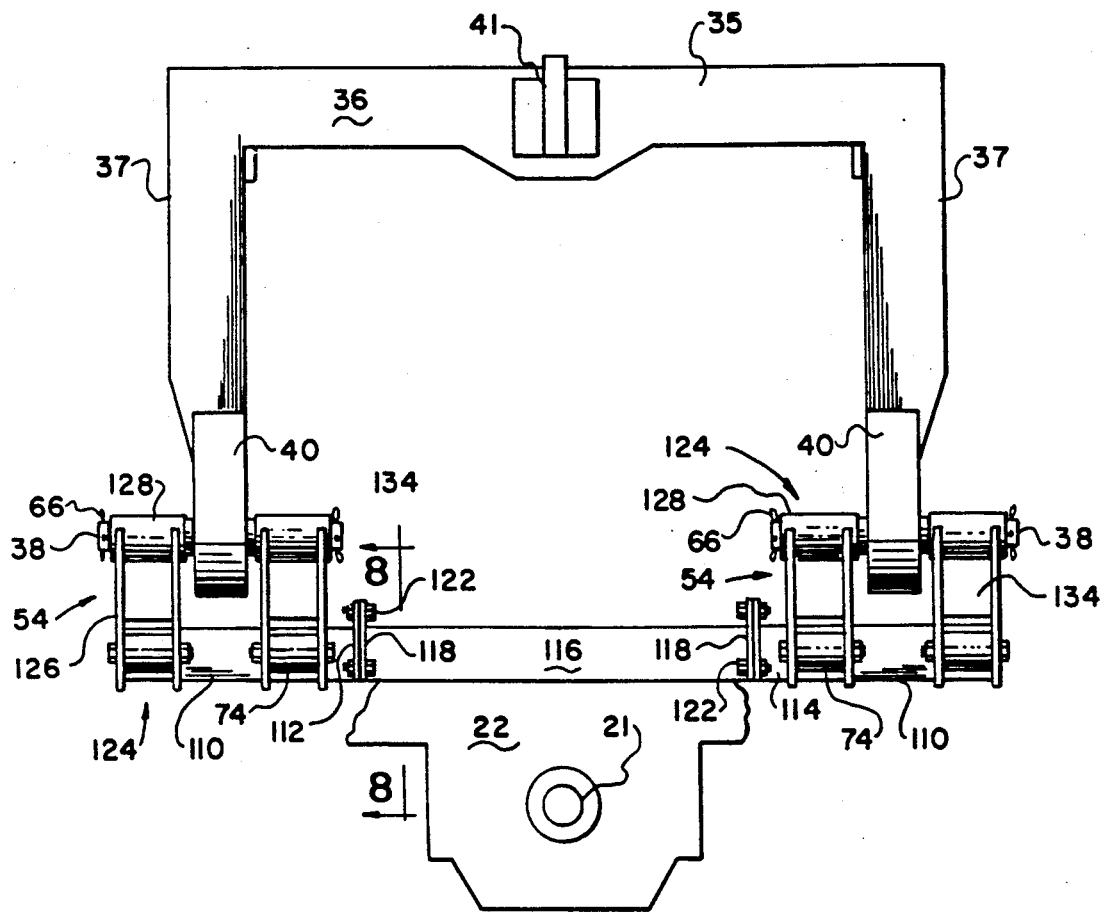
FIG. 7 is is a rear elevational view of the connected yoke without an implement attached, showing the power take off shaft.
Figure 8:
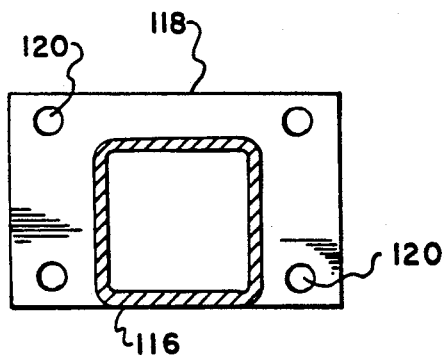
FIG. 8 is a sectional view of the cross brace taken substantially on line 8—8 of FIG. 7.

Referring to the drawings, there may be seen a typical agricultural tractor. Basically, the tractor will include frame 10 Spaced apart frame beams 11, upon which is mounted engine 12, form a portion of the frame (FIGS. 1 and 2). The tractor is guided by turning front wheels 14 mounted upon the front axle 15. The engine is connected through transmission means 17 to rear wheels 16 which are mounted upon axle 18 in axle housing 20. The axle housing is rigidly attached to differential housing 22. The differential housing is rigidly attached to transmission housing 23. The differential housing 22 and transmission housing 23 are considered part of the transmission means 17. The frame beams 11 are parallel and the extend from the front axle 15 to the transmission housing 23. The frame beams 11 are parallel to the tractor axis and the direction of draft. The entire frame includes not only the beams 11 but also the transmission housing 23, differential housing 22, and rear axle housing 20. The front axles 15 and rear axles 18 might also be considered part of the frame 10.

Power takeoff shaft 21 extends from the differential housing 22. As seen in the drawings, the power takeoff shaft is along the center line of the tractor.

Although the frame beams 11 of the tractor are heavy beams, analysis of the stresses which are imposed upon the frame 10 will show that the frame has a certain amount of flexibility. This flexibility or stain is measured in fractions of inches. The extreme forces or stress of the engine 12 drafting tillage implement 24 with plows 25 will result in measurable strain in the frame 10 and frame beams 11. There will be some vibration in the frame.

As discussed before, the rear wheels 16 normally have large low pressure pneumatic tires 26 mounted upon them.

The normal three point hitch includes two lift draw arms or draft links 28, each of which is pivoted by pins 29 to the lower portion of the differential housing 22 and extends rearwardly and outwardly to a distal end 30. It will be noted that the draw lift links are pivoted to the differential housing 22 by horizontal pins 29 which are in about fore and aft alignment with the outside of the frame beams 11. In this application, the distal end 30 of each of the lift links 28 will be at the same level as the other and spaced apart. Top arm or link 32 extends from the center of the upper portion of the differential housing rearwardly and terminates at the top distal end 34.

Quick hitch yokes 36 are commercially available on the market and widely used. The yoke 36 includes a rectangular frame with a connection at top 35 for the top distal end 34. Two legs 37 depend from each side of the top 35 with connections at the lower end for the distal ends 30 of the lift draw links 28. These connections of the distal ends are normally by the use of pin 38. The quick hitch yoke 36 will usually be in a vertical plane transverse the direction of draft.

The rear of the yoke 36 has two upward open draft hooks 40 immediately behind the distal end 30 of the lift draw arm. Top hook 41 is immediately behind the top distal end 34. Therefore, the tillage implement 24 with earth working plows 25 can readily be connected into these hooks 40 and 41, inasmuch as the implement has correlating implement pins 42 which are designed and placed to mate with the hooks 40 and 41.

Two lift arms 44 are mounted upon the upper portion of the differential housing 22. They are pivoted by lift shaft 46 which is connected to a mechanism within the differential housing 22. It will be noted that the lift arms 44 are attached to the lift shaft 46 in approximate alignment with the outside surfaces of the frame beams 11. Lift connecting rod 48 connects the end of each lift arm 44 to one of the lift draw links 28 near, but spaced forward of its distal end 30. Therefore, it can be seen that by raising or lowering the lift arms 44, the lift draft links; and therefore, the quick hitch yoke 36 is raised and lowered, as is the tillage implement 24 with the plows 25 connected thereon. The lift arms 44 sometimes have exterior hydraulic cylinders attached to them. Also, often there is an optional automatic load and depth control connected to the lift arms 44 (See Morling).

As explained above, the structure defined to this point is well known and commercially available on the market. Tractors with equipment like this have been widely sold in the United States.

According to the invention of our previous application, axle draw pins 50 are connected under the axle housing 20 outboard of the point of connection of the lift draw links 28. The distance from the center of the tractor to each axle draw pin 50 is about the same as, or a little more than, the distance from the center of the yoke to each of the distal ends 30. The distance from the connection of the draft links 28 at their connection pins 29 to the differential 22 to the draw pins 50 is about the same as the distance between the pins 29 themselves. I.e., the distance from one draw pin 50 to the other opposite draw pin 50 is about three times the distance between the pins 29. Stated otherwise, the distance between the draw pins 50 is about three times the length of the lift shaft 46.

Stabilizing or auxiliary draw arm or link 52 extends from the draw pin 50 to the yoke 36 at the rear end 53 of the stabilizing draw arm 52. Connection 54 at the rear end 53 attaches to the yoke 36. The draw pins 50 are through axle clamps 56 which are clamped one to each end of the axle housing 20 (FIGS. 1, 3 and 4). The draw pins 50 are normal to the direction of draft and parallel to the rear axle 18.

Belly plates 58 depend from the frame 10 of the tractor forward of the rear axle. Specifically, they depend from the frame beams 11. The belly plates will be attached to the beams 11 preferably by bolting to the outside surfaces thereof. The belly plates will be located about one-half the way between the front axle 15 and the rear axle 18. I.e., the distance from the belly plate on the frame beam to the rear axle 18 is within about 10% or 20% of the midpiont between the front axle and the rear axle. E.g., in one instance the distance from the front axle to rear axle is 114" and the distance from the rear axle to the belly plate is 62".

Frame draw arm 62 extends from belly pin 64 in the belly plate 58 to the axle or draw pin 50, which is mounted on the axle clamp 56 below the axle housing 20. Inasmuch as both the frame draw arm or pitman 62 and the stabilizer draw arm or auxiliary draw link 52 are connected to the draw pin 50 mounted on the axle clamp 56 below the axle housing 20, there is a minimal amount of stress upon the axle housing 20. As explained before, although the parts of the tractor are heavy steel parts, yet, there will be a certain amount of flexibility to them. Also, there will be some tolerance in the holes in the ears of the clamp 56. Therefore, the draft from the belly plate 58 to the yoke connection 54 will be from the belly plate 58 and not from the axle housing 20.

When the tillage implement 24 is raised or lowered, the stabilizing arm 52 will pivot about the draw pins 50, and the draw pins 50 will provide a certain amount of stabilization through the axle housing 20. However, the main stress is transmitted to the tillage equipment through the quick hitch yoke 36 from the belly plates 58.

It is preferred that the frame draw arm 62 be level for best operation. Satisfactory operation can be had with the pin 64 higher or slightly lower than the axle pin 50.

It will be noted from the drawing that the lift draw arm or draft link 28 is attached to the differential housing 22 by pin 29 which is located to the rear and below the draw pin 50. The distal end 30 of the draw link 28 is connected by the pin or shaft 38 which extends from the outboard of the yoke 36 on each end. The shaft 38 is rotatable in the yoke 36. The end of the stabilizer arm or auxiliary draw link 52 connects to the shaft pin 38.

The structure described to this point is basically the structure defined in the prior application indentified above.

Cross arm 110 is attached at the rear end 53 of the stabilizer draw arm 52. A gusset makes the cross arm 110 rigid with the stabilizing draw arm 52. The cross arm is at right angles to or normal to the direction of draft. Flat plate 112 or fitting is attached to the medial end 114 of the cross arm. The fitting 112 also could be considered to be attached or connected to the stabilizer draw arm 52 at the rear end 53. The fitting 112 is attached to each of the stabilizer draw arms.

Cross brace 116 has flat plate 118 on each end thereof. Each of the flat plates 112 and 118 have four bolt holes 120 therethrough. Bolts 122 extend through the bolt holes to securely fasten the plates together which, in effect, forms a rigid unit of the two stabilizer draw arms 52. However, as pointed out above, the bolts 122 may be removed and the cross brace 116 be removed in the event the farmer is using an implement requiring power takeoff 21 or the like.

With the reduction of the bracing between the stabilizer shafts, it is desirable to more rigidly fix the stabilizer draw arms 52 to the yoke 36 in the lateral direction. This is accomplished by making the connection 54 in the form of two chain link units 124 on each stabilizer draw arm. The two chain link units 124 could also be described as connection means for stabilizing the agricultural implement from the stabilizer draw arms, raising and lowering the stabilizer arms by the lift arms, and preventing lateral movement of the implement relative to the stabilizer arms. It will be noticed that the connection means or chain link units 124 straddle the connection 30 of the lift draw arms 52 to the yoke 36.

Thus by the locking of the chain links the tillage implement is rigidly fixed to the tractor while tilling the soil.

There is a separate shaft 38 for each of the stabilizer arms 52 or each of the legs 37 of the yoke. Each chain link unit 124 will include two chain links 126 which are connected by bushing 128. The bushing 128 will telescope over the shaft 38. The shaft is held by key 66 at each end. Bushing 74 is connected to the rear end 53 of the stabilizer draw arm. As shown, there will be one bushing 74 at each end of the cross arm 110. The chain links 126 will straddle the bushing 74 and be held in place by bolt pivot 68.

To increase the rigidity of the connection of the stabilizing draw arm to the yoke, web 134 is connected between the two individual chain links 126 and welded securely to them as well as to the bushing 128.

The embodiment shown and described above is only exemplary. We do not claim to have invented all the parts, elements or steps described. Various modifications can be made in the construction, material, arrangement, and operation, and still be within the scope of our invention.

The restrictive description and drawing of the specific examples above do not point out what an infringement of this patent would be, but are to enable one skilled in the art to make and use the invention. The limits of the invention and the bounds of the patent protection are measured by and defined in the following claims.

We claim as our invention:

1. The procedure for tilling agricultural land with an agricultural tractor having
   a. a differential housing to which a rear axle housing is connected,
   b. rear wheels journaled to the axle housing,
   c. large low pressure tires on the rear wheels,
   d. a front axle,
   e. front wheels on the front axle,
   f. two spaced apart frame beams extending rearward from the front axle,
   g. an engine on the frame beams,
   h. transmission means on the tractor for transmitting power from the engine to the rear wheels,
   i. a transmission housing interconnecting the frame beams and the differential housing,
   j. a quick hitch yoke in the form of a vertical frame,
   k. said yoke including three hooks, two draft hooks at the same level and spaced apart, and a top hook above and between the draft hooks,
   l. two draft links,
   m. each draft link pivoted to the yoke immediately forward a draft hook, each draft link pivoted to the differential housing,
   n. a top link connected from the yoke immediately forward of the top hook and extending to the differential housing,
   o. an earth working implement having three bolts,
   p. said three bolts located in said three hooks to quickly attach and detach the earth working implement to the quick hitch yoke,
   q. the improved method of tilling the soil comprising:
   r. at least partially drafting the earth working implement through the yoke from the frame beams forward of the transmission means, and
   s. rigidly fixing horizontally and vertically the earth working implement to the tractor while tilling the soil.

2. The invention as defined in claim 1, further comprising:
   t. two stabilizing draw arms for partially drafting the earth working implement forward of the transmission means and also for rigidly fixing the earth working implement, and
   u. said method further comprising:
   v. rigidly cross bracing said stabilizing draw arms to each other.

3. The invention as defined in claim 1, further comprising:
   t. a power takeoff shaft extending rearwardly from said transmission means, and
   u. two stabilizing draw arms for partially drafting the earth working implement forward of the transmission means and also for rigidly fixing the tillage implement, and
   v. said method further comprising:
   w. rigidly cross bracing said stabilizing draw arms to each other for more rigidly fixing the earth working implement, and
   x. removing said cross bracing for extension of said power takeoff shaft.

4. The invention as defined in claim 1 further comprising:
   t. two stabilizing draw arms for partially drafting the earth working implement forward of the transmission means and also,
   u. wherein the earth working implement is rigidly fixed to the tractor by locking chain links to said stabilizing draw arms, the earth working implement being connected to said chain links.

* * * * *